United States Patent
Shao

(10) Patent No.: US 8,583,963 B2
(45) Date of Patent: Nov. 12, 2013

(54) COMPUTING DEVICE AND SYSTEM ERROR DETECTION METHOD

(75) Inventor: Wei Shao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 298 days.

(21) Appl. No.: 13/217,289

(22) Filed: Aug. 25, 2011

(65) Prior Publication Data

US 2012/0137180 A1 May 31, 2012

(30) Foreign Application Priority Data

Nov. 29, 2010 (CN) .......................... 2010 1 0564661

(51) Int. Cl.
*G06F 11/00* (2006.01)
(52) U.S. Cl.
USPC ................ 714/37; 714/38.1; 714/45; 714/48; 714/57
(58) Field of Classification Search
USPC ........... 714/25, 27, 33, 37, 38.1, 39, 45, 47.1, 714/48, 57
See application file for complete search history.

(56) References Cited

U.S. PATENT DOCUMENTS

| 6,233,634 | B1 * | 5/2001 | Clark et al. ..................... | 714/48 |
| 7,159,146 | B2 * | 1/2007 | Bowers et al. ................. | 714/37 |
| 2010/0115348 | A1 * | 5/2010 | Gilluwe ........................ | 714/57 |
| 2012/0102373 | A1 * | 4/2012 | Waugh ........................... | 714/57 |
| 2013/0145214 | A1 * | 6/2013 | Provencher et al. ........... | 714/37 |

* cited by examiner

*Primary Examiner* — Joseph D Manoskey
(74) *Attorney, Agent, or Firm* — Altis & Wispro Law Group, Inc.

(57) ABSTRACT

In a system error detection method of a computing device, the computing device includes a graphics controller and a display screen. A frame of an image that is currently displayed on the display screen is obtained from a video memory of the graphics controller at regular intervals. The obtained image is compared with abnormal images of the display screen prestored in a storage system, to detect whether the computing device works abnormally. Characters of the obtained image are extracted when the computing device works abnormally. System errors of the computing device are detected by comparing the extracted characters with system error codes of the computing device that are stored in the storage system.

15 Claims, 3 Drawing Sheets

COMPUTING DEVICE AND SYSTEM ERROR DETECTION METHOD

BACKGROUND

1. Technical Field

Embodiments of the present disclosure relate generally to error detection technologies, and particularly to a computing device and a system error detection method of the computing device.

2. Description of Related Art

System errors of a computing device (e.g., a computer) usually occur due to device driver conflicts, program crashes, data destroyed by virus, and other capable reasons. The blue screen of death (BSOD) may often be caused by a critical system error. If the system errors cannot be detected, it may cause an entire system of the computing device to fail. Therefore, an efficient method for detecting the system errors is desired.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
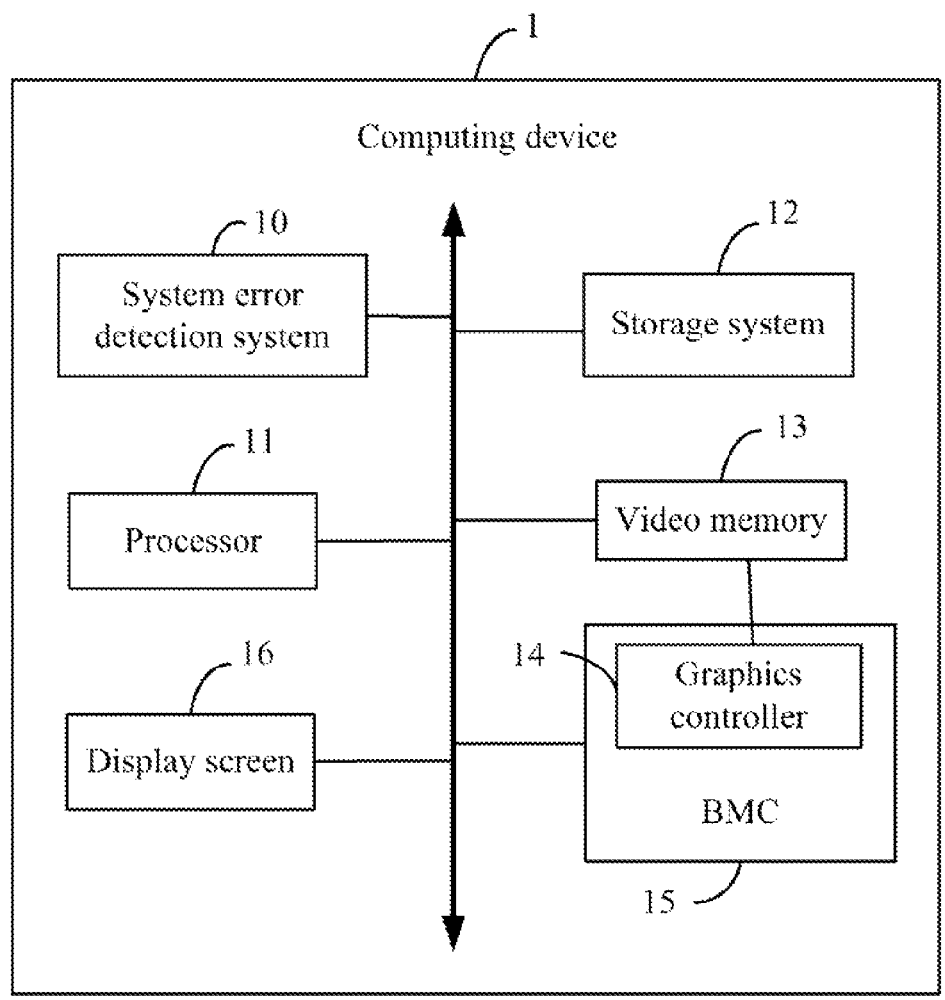
FIG. 1 is a block diagram of one embodiment of a computing device including a system error detection unit.
Figure 2:
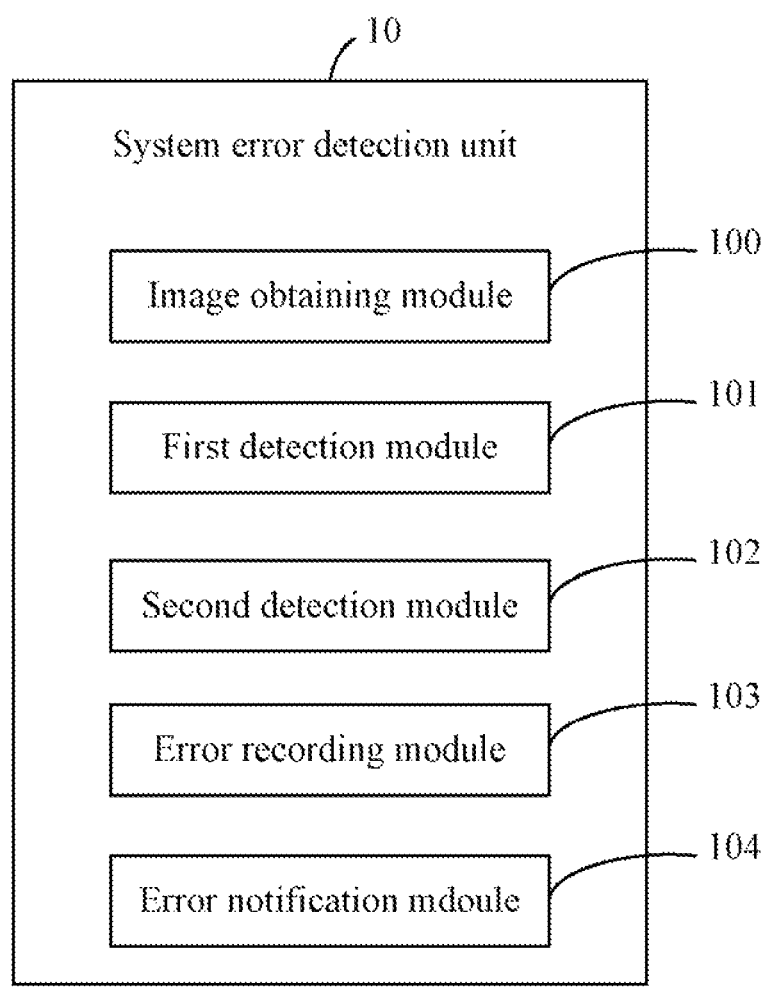
FIG. 2 is a block diagram of one embodiment of functional modules of the system error detection unit in FIG. 1.

FIG. 1 is a block diagram of one embodiment of a computing device 1 including a system error detection unit 10. The device 1 further includes a processor 11, a storage system 12, a baseboard management controller (BMC) 15, and a display screen 16. In the embodiment, the BMC 15 comprises a graphics controller 14. The graphics controller 14 includes a video memory 13. The video memory 13 stores image data to be processed by the graphics controller 14. The graphics controller 14 processes the image data of the video memory 13, generates and outputs images to the display screen 16 according to the processed image data, so as to drive the display screen 16. The system error detection unit 10 can detect system errors of the computing device 1 by analyzing images displayed on the display screen 16, where details are provided below. It is understood that FIG. 1 is only one example of the computing device 1 and the computing device 1 can include more or fewer components than those shown in the embodiment, or a different configuration of the various components.

The system error detection unit 10 may include a plurality of software programs in the form of one or more computerized instructions stored in the storage system 12, and executed by the processor 11 to perform the operations of the computing device 1. In the embodiment, the system error detection unit 10 includes an image obtaining module 100, a first detection module 101, a second detection module 102, an error recording module 103, and an error notification module 104. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The image obtaining module 100 is operable to obtain a frame of an image that is currently displayed on the display screen 16 from the video memory 13 at regular intervals, such as one second or two seconds.

The first detection module 101 is operable to compare the obtained image with abnormal images of the display screen 16 prestored in the storage system 12, and detect whether the computing device 1 works abnormally according to the comparison. In the embodiment, if the obtained image is the same or similar to any of the abnormal images, such as RGB (red, green, blue) values of most pixels of the obtain image are the same with RGB values of corresponding pixels of an abnormal image, the first detection module 101 determines that the computing device 1 works abnormally. The abnormal images are reference images that may be displayed on the display screen 16 when one or more system errors, such as a blue screen of death (BSOD), of the computing device 1 occur. The abnormal images may be precaptured and stored in the storage system 12.

The second detection module 102 is operable to extract characters of the obtained image when the computing device 1 works abnormally. In the embodiment, the characters may be composed of numbers, letters, and others special characters that are displayed on the obtained image. The second detection module 102 may extract the characters using an optical character recognition (OCR) method. In one example, the characters may be extracted according to the following steps. First, the second detection module 102 converts a format of the obtained image into a predetermined format, such as a "tiff" file. Second, the second detection module 102 removes noise (e.g., undesired artifacts) of the converted image. Third, the detection module 102 extracts the characters from the converted image using the OCR method.

The second detection module 102 is further operable to detect whether one or more system errors of the computing device 1 have occurred by comparing the extracted characters with system error codes of the computing device 1 that are stored in the storage system 12. If the extracted characters include one or more of the system error codes, the second detection module 102 determines that one or more system errors of the computing device 1 have occurred. In the embodiment, the system error codes of the computing device 1 are stored in the storage system 12. The system error codes may be, for example, such as, "0x0000", "0x0001", "0x0002", . . . , "0x0427".

The error recording module 103 is operable to record the extracted characters in an error log, and temporarily store the error log in the storage system 12, so the one or system errors of the computing device 1 may be debugged according to the error log. In one embodiment, the error log may be a text file.

The error notification module 104 is operable to generate a notification to notify a user of the computing device 1 to debug the one or more system errors according to the error log. In one embodiment, the notification may be text messages that are displayed on the display screen 16, and indicate the user to debug the system errors according to the error log.

Figure 3:
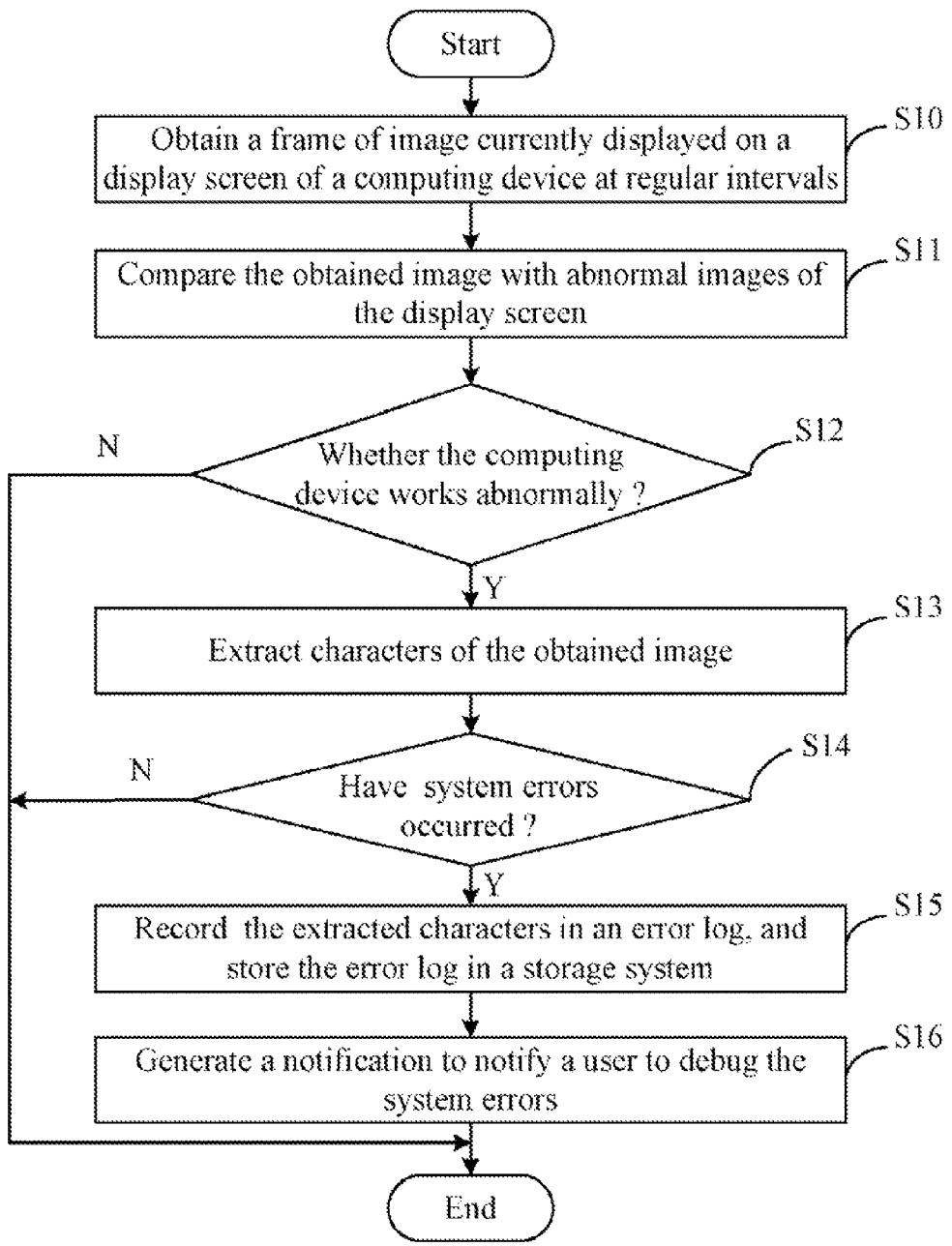
FIG. 3 is a flowchart of one embodiment of a system error detection method of the computing device using the system error detection unit of FIG. 1.

FIG. 3 is a flowchart of one embodiment of a system error detection method of the computing device 1 using the system error detection unit 10 of FIG. 1. Depending on the embodiment, additional blocks may be added, others removed, and the ordering of the blocks may be changed.

In block S10, the image obtaining module 100 obtains a frame of an image that is currently displayed on the display screen 16 from the video memory 13 at regular intervals, such as one second or two seconds.

In block S11, the first detection module 101 compares the obtained image with the abnormal images of the display screen 16 prestored in the storage system 12. The abnormal images are reference images that may be displayed on the display screen 16 when one or more system errors, such as a blue screen of death (BSOD), of the computing device 1 occur.

In block S12, the first detection module 101 detects whether the computing device 1 works abnormally according to the comparison. If the computing device 1 works abnormally, block S13 is implemented. If the computing device 1 works normally, ends the procedure. In the embodiment, if the obtained image is the same or similar to any of the abnormal images, the first detection module 101 determines that the computing device 1 works abnormally.

In block S13, the second detection module 102 extracts characters of the obtained image. In the embodiment, the second detection module 102 may extract the characters using an optical character recognition (OCR) method as described above.

In block S14, the second detection module 102 detects whether one or more system errors of the computing device 1 have occurred by comparing the extracted characters with the system error codes of the computing device 1 stored in the storage system 12. If one or more system errors have occurred, block S15 is implemented. If no system error has occurred, the procedure ends. In the embodiment, if the extracted characters include one or more of the system error codes, one or more system errors of the computing device 1 have occurred.

In block S15, the error recording module 103 records the extracted characters in an error log, and store the error log in the storage system 12.

In block S16, the error notification module 104 generates a notification to notify the user to debug the one or more system errors according to the error log. In one embodiment, the notification may be text messages that are displayed on the display screen 16.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A system error detection method of a computing device, the computing device comprising a graphics controller and a display screen, the method comprising:
   obtaining a frame of an image that is currently displayed on the display screen from a video memory of the graphics controller at regular intervals;
   comparing the obtained image with abnormal images of the display screen prestored in a storage system of the computing device, and detecting whether the computing device works abnormally according to the comparison;
   extracting characters of the obtained image when the computing device works abnormally; and
   detecting system errors of the computing device by comparing the extracted characters with system error codes of the computing device that are stored in the storage system.

2. The method according to claim 1, further comprising:
   recording the extracted characters in an error log when one or more system errors of the computing device are detected, and storing the error log in the storage system; and
   generating a notification for a user, the notification indicating the user to debug the system errors according to the error log.

3. The method according to claim 1, wherein the extracting step comprises:
   converting a format of the obtained image into a predetermined format;
   removing noise of the converted image; and
   extracting the characters from the converted image using an optical character recognition (OCR) method.

4. The method according to claim 1, wherein the abnormal images are reference images that are displayed on the display screen when the system errors of the computing device Occur.

5. The method according to claim 1, wherein the graphics controller is installed in a baseboard management controller of the computing device.

6. A computing device, comprising:
   a display screen;
   a graphics controller;
   at least one processor;
   a storage system; and
   one or more programs stored in the storage system and being executable by the at least one processor, the one or more programs comprising:
   an image obtaining module operable to obtain a frame of an image that is currently displayed on the display screen from a video memory of the graphics controller at regular intervals;
   a first detection module operable to compare the obtained image with abnormal images of the display screen prestored in the storage system, and detect whether the computing device works abnormally according to the comparison; and
   a second detection module operable to extract characters of the obtained image when the computing device works abnormally, and detect system errors of the computing device by comparing the extracted characters with system error codes of the computing device that are stored in the storage system.

7. The computing device according to claim 6, wherein the one or more programs further comprises:
   an error recording module operable to record the extracted characters in an error log when the system errors of the computing device are detected, and store the error log in the storage system; and
   an error notification module operable to generate a notification for a user, the notification indicating the user to debug the system errors according to the error log.

8. The computing device according to claim 6, wherein the characters are extracted by:
   converting a format of the obtained image into a predetermined format;
   removing noise of the converted image; and
   extracting the characters from the converted image using an optical character recognition (OCR) method.

9. The computing device according to claim 6, wherein the abnormal images are reference images that are displayed on the display screen when the system errors of the computing device occur.

10. The computing device according to claim 6, wherein the graphics controller is installed in a baseboard management controller of the computing device.

11. A non-transitory storage medium storing a set of instructions, the set of instructions capable of being executed by a processor of a computing device, cause the computing device to perform a system error detection method, the computing device comprising a graphics controller and a display screen, the method comprising:

obtaining a frame of an image that is currently displayed on the display screen from a video memory of the graphics controller at regular intervals;

comparing the obtained image with abnormal images of the display screen prestored in a storage system of the computing device, and detecting whether the computing device works abnormally according to the comparison;

extracting characters of the obtained image when the computing device works abnormally; and detecting system errors of the computing device by comparing the extracted characters with system error codes of the computing device that are stored in the storage system.

12. The non-transitory storage medium according to claim 11, where in the method further comprises:

recording the extracted characters in an error log when the system errors of the computing device are detected, and storing the error log in the storage system; and generating a notification to for a user, the notification indicating the user to debug the system errors according to the error log.

13. The non-transitory storage medium according to claim 11, wherein the extracting step comprises:

converting a format of the obtained image into a predetermined format;

removing noise of the converted image; and extracting the characters from the converted image using an optical character recognition (OCR) method.

14. The non-transitory storage medium according to claim 11, wherein the abnormal images are reference images that are displayed on the display screen when the system errors of the computing device occur.

15. The non-transitory storage medium according to claim 11, wherein the graphics controller is installed in a baseboard management controller of the computing device.

\* \* \* \* \*